(12) United States Patent
Zhang et al.

(10) Patent No.: US 10,872,273 B2
(45) Date of Patent: Dec. 22, 2020

(54) SYSTEM AND METHOD FOR BATCH-NORMALIZED RECURRENT HIGHWAY NETWORKS

(71) Applicant: Kodak Alaris Inc., Rochester, NY (US)

(72) Inventors: Chi Zhang, Rochester, NY (US); Raymond Ptucha, Rochester, NY (US); Alexander Loui, Rochester, NY (US); Carl Salvaggio, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 15/968,012

(22) Filed: May 1, 2018

(65) Prior Publication Data

US 2018/0322368 A1 Nov. 8, 2018

Related U.S. Application Data

(60) Provisional application No. 62/500,347, filed on May 2, 2017.

(51) Int. Cl.
```
G06K 9/62      (2006.01)
G06N 3/08      (2006.01)
G06N 3/04      (2006.01)
```
(52) U.S. Cl.
CPC ........ *G06K 9/6262* (2013.01); *G06K 9/6256* (2013.01); *G06K 9/6274* (2013.01); *G06N 3/0445* (2013.01); *G06N 3/08* (2013.01); *G06N 3/084* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 2007/0288242 | A1* | 12/2007 | Spengler | G10L 15/20 704/275 |
| 2010/0266179 | A1* | 10/2010 | Ramsay | G06T 7/0012 382/131 |

OTHER PUBLICATIONS

International Search Report and Written Opinion dated Aug. 10, 2018 issued in PCT/US2018/030465.
Ioffe, "Batch Renormalization: Towards Reducing Minibatch Dependence in Batch-Normalized Models," Mar. 30, 2017 https://arxiv.org/abs/1702.03275v2.
Greff et al., "Highway and Residual Networks Learn Unrolled Iterative Estimation," Mar. 14, 2017, https://arxiv.org/abs/1612.07771v3.
Zilly et al., "Recurrent Highway Networks," Mar. 3, 2017, https://arxiv.org/abs/1607.03474v4.
Liao et al., "Bridging the Gaps Between Residual Learning, Recurrent Neural Networks and Visual Cortex," Apr. 13, 2016, https://arxiv.org/abs/1604.03640v1.

(Continued)

*Primary Examiner* — Chan S Park
*Assistant Examiner* — Elisa M Rice
(74) *Attorney, Agent, or Firm* — Hogan Lovells US LLP

(57) ABSTRACT

Embodiments of the present disclosure relate to a recurrent framework based on Recurrent Highway Networks (RHNs) for sequence modeling using batch normalization. In certain embodiments, constraints within the RHNs are relaxed to reduce or avoid gradient vanishing or exploding by normalizing the current transition units in highway layers.

9 Claims, 4 Drawing Sheets
(1 of 4 Drawing Sheet(s) Filed in Color)

(56) References Cited

OTHER PUBLICATIONS

Cooijmans et al., "Recurrent Batch Normalization," Feb. 28, 2017, https://arxiv.org/abs/1603.09025v5.
Ba et al., "Layer Normalization," Jul. 21, 2016, https://arxiv.org/abs/1607.06540v1.
Salimans et al., "Weight Normalization: A simple Reparameterization to Accelerate Training of Deep Neural Networks," Jun. 4, 2016, https://arxiv.org/abs/1602.07868v3.

* cited by examiner

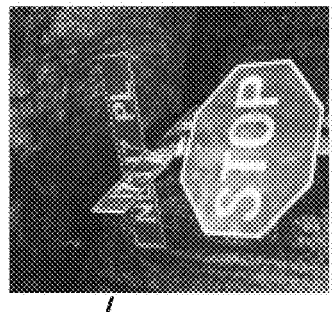

(LSTM) a group of people standing around a parking meter.
(RHN) a group of people standing next to each other.
(BN_RHN) a young man riding a skateboard down a street.
(G.T.) a person is doing a trick on a skateboard.

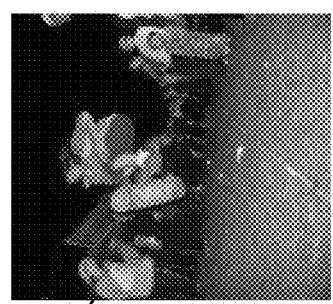

(LSTM) a box with a donut and a cup of coffee.
(RHN) a birthday cake with a picture of a dog on it.
(BN_RHN) a plate with a doughnut and a cup of coffee.
(G.T.) A bag with a hot dog inside of it.

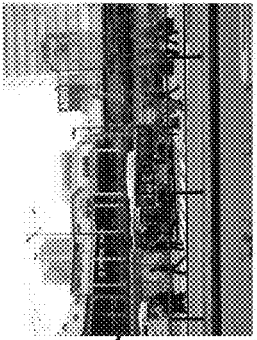

(LSTM) a red stop sign sitting on top of a metal pole.
(RHN) a red stop sign sitting on the side of a road.
(BN_RHN) a stop sign with a street sign attached to it.
(G.T.) Street corner sign above a red stop sign.

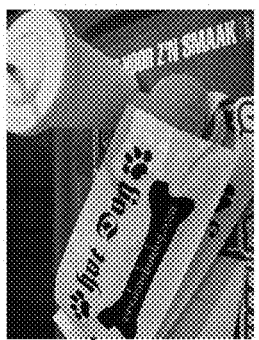

(LSTM) a bus driving down a street next to a tall building.
(RHN) a group of people riding bikes down a street.
(BN_RHN) a city street filled with lots of traffic.
(G.T.) A group of people walking down a sidewalk near a bus.

FIG.4

SYSTEM AND METHOD FOR BATCH-NORMALIZED RECURRENT HIGHWAY NETWORKS

CROSS-REFERENCE TO RELATED APPLICATIONS

This application is a non-provisional of, and claims priority to, U.S. provisional application No. 62/500,347, filed on May 2, 2017.

BACKGROUND

The present disclosure relates to computer vision, and more particularly, to systems and methods for batch-normalized recurrent highway networks for object recognition and image captioning. Deep learning methods, such as Convolutional Neural Networks (CNNs), are often used in various pattern recognition tasks, such as optical character recognition or image matching. CNNs, and other neural networks, may be improved by increasing the depth of the networks, thereby reducing error on competitive benchmark testing. Yet, as the depth of these networks increases, training may be challenging because the distribution of each layer's input will change during training. Moreover, increasing the depth for Recurrent Neural Networks (RNNs), which are already deep in time domain, typically does not provide significant advantages because the state update modeled by certain internal function mapping in modern RNNs is usually represented by non-linear activations. Additionally, for RNNs, gradients are unstable and may vanish or explode over time.

To combat problems associated with gradients, techniques such as batch normalization may be used. Batch normalization can address the internal covariate shift problems associated with CNNs, particularly feed forward CNNs, by normalizing the layer inputs per mini-batch. As such, training may be sped up because of more aggressive learning rates, stable models may be created which are not as susceptible to parameter initialization, and vanishing and exploding gradients may be reduced. Moreover, certain batch normalization techniques may be applied to RNNs to obtain faster convergence, although these techniques do not improve the generalization of performance on sequence modeling tasks. For example, batch normalization may be used on the input-to-hidden transitions and/or the hidden-to-hidden transitions to reduce covariate shifts between time steps.

Additionally, focus in neural networks is placed on controlling gradient behavior by modifying network structures. For example, establishing networks with stochastic depth enables training of short networks and also using deep networks at test time. Elements of this approach may be applied to residual networks to reduce training time and improve test error. Additionally, in certain configurations, CNNs may receive benefit from an interface to explicitly constructed memory mechanisms interacting with a CNN feature processing hierarchy. Correspondingly, the convolutional residual memory network may be used as a memory mechanism which enhances CNN architecture based on augmenting convolutional residual networks with a Long Short-Term Memory (LSTM) mechanism. Weight normalization may be used for recurrent models, such as LSTMs compared to batch normalization. It improves the conditioning of the optimization problem and speeds up convergence of stochastic gradient descent without introducing any dependencies between the examples in a mini-batch. Similarly, layer normalization normalizes across the inputs on a layer-by-layer basis at each time step. This stabilizes the dynamics of the hidden layers in the network and accelerates training, without the limitation of being tied to a batched implementation.

Further gradient control may be obtained with the introduction of highway layers. Recurrent Highway Networks (RHNs), based on highway layers, relax the limitation of training deep RNNs. Specifically, a highway network defines two nonlinear transforms: the transform gate and carry gate. These gates express how much of the output is produced by transforming the input and carrying it, respectively. By coupling the transform gate and carrying gate, a highway layer can smoothly vary its behavior between that of a plain layer and that of a layer which simply passes its inputs through. Due to this gating mechanism, a neural network can have paths along which information can flow across several layers without attenuation. Thus, highway networks, even with hundreds of layers, can be trained directly using stochastic gradient descent. These networks, when used with a variety of activation functions, have been shown to avoid the vanishing or exploding gradient problem. Highway layers have achieved success in the fields of speech recognition and language modeling.

Highway layers have contributed to the establishment of RHNs that have long credit assignment paths, not just in time, but also long in space (per time step). By replacing the LSTM cell in the recurrent loop, the RHN layer instead stacks the highway layers inside the recurrent units. By increasing recurrence depth, additional non-linearity strengthens the ability of the recurrent network without slowing down the convergence. Compared to regular RNNs, RHNs provide more versatile ways to deal with data flow in terms of transforming and carrying information. It has been theoretically proven that coupling a carrying and transforming gate effectively controls the gradient. However, such a constraint may limit the power of the network to some extent. Hence, new solutions are needed to overcome these problems by potentially relaxing the constraints in RHNs.

SUMMARY

Applicant has recognized the problems noted above and has conceived and developed embodiments of system and method, according to the present disclosure, for object recognition and image captioning. According to an embodiment of the present invention, a computer-implemented method for object recognition and image captioning is provided. The method comprises first loading a pre-trained model into a computing network. Next, the method receives, identifies, or selects a digital image input on which to perform object recognition and captioning in accordance with the methods described herein. The digital image must therefore contain one or more objects. Next, the method comprises batch normalizing the digital image input and applying one or more non-linear transforms to the digital input image to generate one or more transform outputs from the computing network. The method lastly combines the one or more transform outputs to generate a final output from the computing network. In an exemplary embodiment, the final output contains a caption describing the content of the digital image input. In other embodiments, the method comprises additional features. For example, the pre-trained model may contain parameters for the computing network nodes. The computing network incorporated into the methods of the present invention may be multi-layer neural networks. More specifically, an exemplary multi-layer neural network is a Recurrent Highway Network (RHN), or alternatively, a batch-normalized RHN. One advantage of embodiments of the present invention is that the constraints within the Recurrent Highway Network are relaxed to reduce or avoid gradient vanishing or exploding by normalizing the current transition units in highway layers.

According to another exemplary embodiment, another computer-implemented method for object recognition and image captioning is provided. Such method comprises, as a first step, receiving a digital image input, wherein the digital image input containing one or more objects. Next, the method calls for batch normalizing the digital image input and applying one or more non-linear transforms to the digital input image to generate one or more transform outputs. And, lastly, the method comprises combining the one or more transform outputs to generate a final output.

BRIEF DESCRIPTION OF DRAWINGS

The patent or application file contains at least one drawing executed in color. Copies of this patent or patent application publication with color drawing(s) will be provided by the Office upon request and payment of necessary fee. The features of the invention will become more readily apparent and may be better understood by referring to the following detailed description in conjunction with the drawings, which include:

FIG. 4 is a schematic diagram of an embodiment example results, in accordance with embodiments of the present disclosure.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present invention are not intended to be interpreted as excluding the existence of additional embodiments that also incorporate the recited features.

Embodiments of the present invention relate to a recurrent framework based on Recurrent Highway Networks (RHNs) for sequence modeling using batch normalization. In certain embodiments, constraints within the RHNs are relaxed to reduce or avoid gradient vanishing or exploding by normalizing the current transition units in highway layers. These methods simultaneously improve network performance while avoiding the vanishing and exploding gradient problems.

Figure 1:
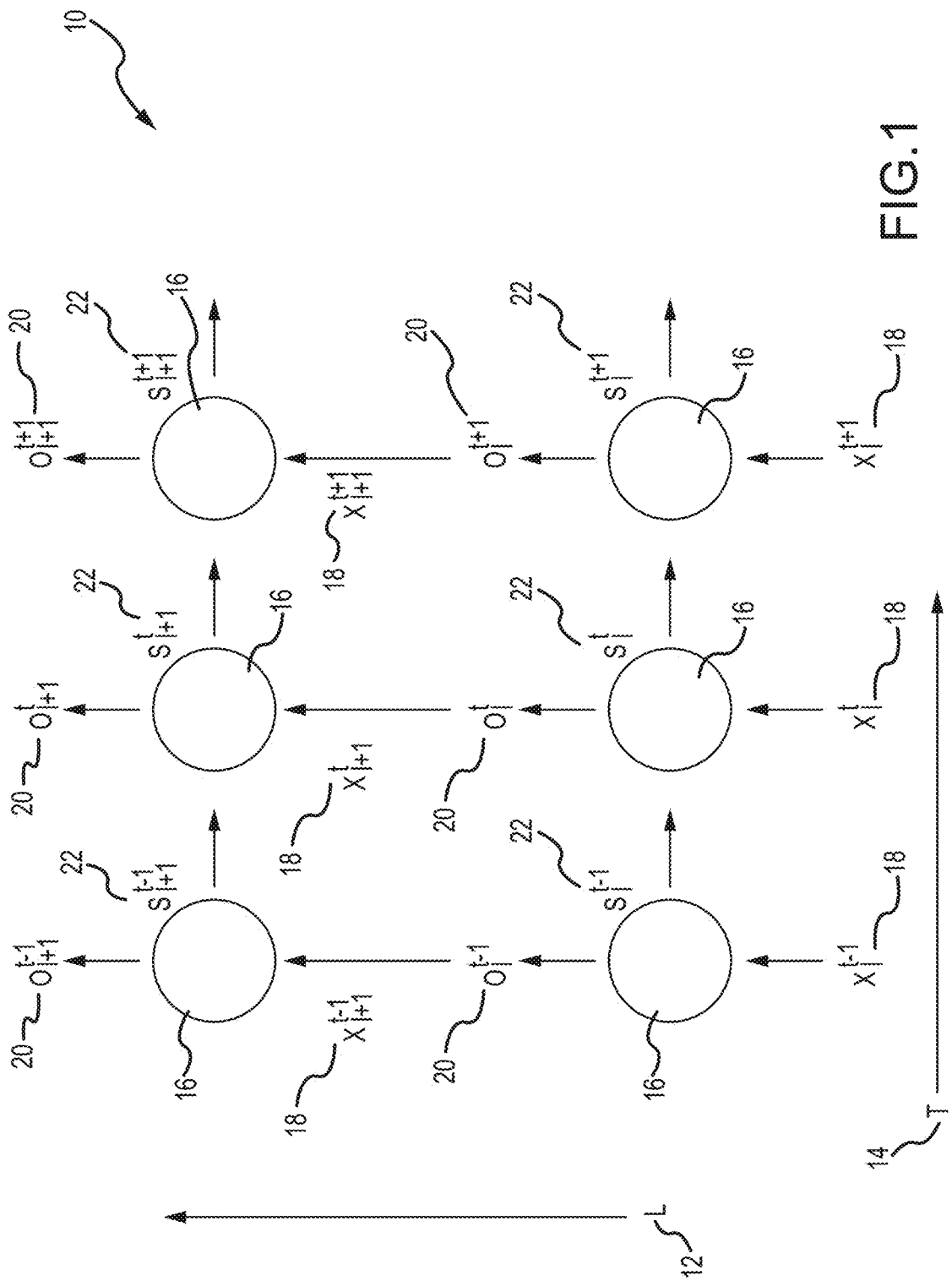
FIG. 1 is a schematic diagram of an embodiment of a recurrent neural network, in accordance with embodiments of the present disclosure.

FIG. 1 is a schematic block diagram of an embodiment of a Recurrent Neural Network (RNN) 10. RNNs make use of information in sequence—for example, input data that has a temporal relationship, such as video streams and batch image data. Instead of independent inputs and outputs, RNNs use outputs from a previous node in subsequent nodes, performing the same task on every element with the input being dependent on the output of the previous node, which is fed into subsequent nodes. The RNN 10 consists of L layers 12 and T time states 14. Each node 16 in the layer 12 l∈{1, 2, . . . , L} and time state 14 t∈{1, 2, . . . , T} takes input 18 represented by $x_l^t$ and output 20 represented by $o_l^t$, respectively, with a non-linear transformation H at a hidden state 22 represented by $s_l^t$. Omitting the bias term for simplicity, the hidden state 22, which is fed into other portions of the RNN, can be represented as $$s = H(x, W_H) \quad (1)$$

where the non-linear activation H is typically specified by hyperbolic tangent function tan h, and $W_H$ is the associated weight matrix. Accordingly, the output 20 at each time state 14 can be retrieved while additional information can be fed into subsequent nodes 16, along with the inputs 18.

Figure 2:
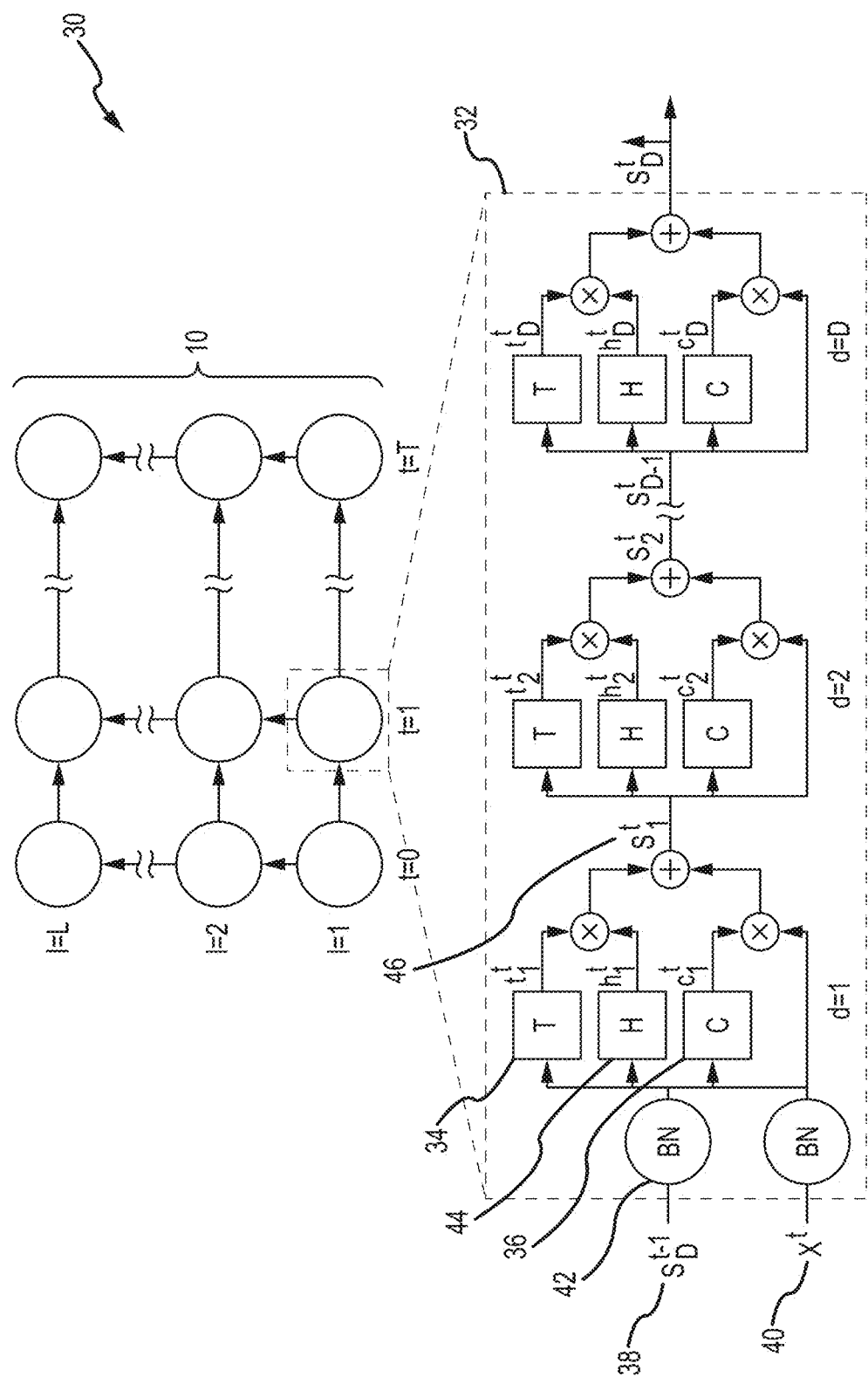
FIG. 2 is a schematic diagram of an embodiment of a batch normalized recurrent highway network, in accordance with embodiments of the present disclosure.

FIG. 2 is a schematic block diagram of an embodiment of a batch normalized Recurrent Highway Network (RHN) 30. In highway networks, the training process is facilitated by using adaptive computation. RHNs use highway layers instead of Long Short-Term Memory (LSTM) in regular RNNs. Batch normalized highway layers 32 are illustrated in the dotted box of FIG. 2. The highway layers 32 include transform gates 34, labeled as "T" and carry gates 36, labeled as "C". These gates determine how much information is transformed and carried to the output, as represented by Equations (2) and (3) below, $$t = T(x, W_T) \quad (2)$$

$$c = C(x, W_C) \quad (3)$$

where t, c are the output of the transform and carry gate respectively. In operation, T and C are defined as a sigmoid function in Equation (4)

$$\sigma(x) = 1/(1+e^{-x}) \quad (4)$$

and $W_T, W_C$ are corresponding weights. The RHN layer with recurrence depth D is defined as $$s_d^t = h_d^t \odot t_d^t + s_{d-1}^t \odot c_d^t \quad (5)$$

where ⊙ implies the element-wise product.

As illustrated in FIG. 2, each recurrent loop (in a particular highway layer 32) includes two inputs. A first input 38 is represented by an output of the last recurrent unit in a previous loop. In the illustrated embodiment, the first input 38 is represented by $s_D^{t-1}$. The second input 40 is represented by $x^t$. Each of these inputs 38, 40 is batch normalized 42 before further processing, as represented by BN. Thereafter, the inputs 38, 40 are processed by the transform gate 34, the carry gate 36, and a nonlinear transform 44, represented by H. As shown in FIG. 2, subsequent processing through the node as represented by Equation (5) illustrates an output 46 from the node. This output 46 is then utilized as the input 38 for subsequent operations along the depth of the RHN layer.

In the embodiment illustrated in FIG. 2, each recurrent loop takes the output of the last recurrent unit in the previous loop ($s_{d-1}^r$) as input, and the time-varying data $x^t$ is only fed into the recurrent loop to the recurrence depth, d=1. According to Gergorin circle theorem, all eigenvalues of the temporal Jacobian are preferably set to 1 across time steps in order to keep the gradient flow steady. In this case, the Gergorin circle radius is reduced to 0 and each diagonal entry of temporal Jacobian is set to 1. This is accomplished by coupling the carry gate to the transform gate by setting C=1−T, as a constraint, in order to prevent an unbounded "blow-up" of state values which leads to more stable training. However, this constraint may limit the ability of the gates to freely learn parameter values and imposes a modeling bias which may be suboptimal for certain tasks.

Because of its ability to control the gradient during back propagation, batch normalization is incorporated to the inputs 38, 40 of each recurrent loop. This allows relaxation of the C=1−T constraint, while simultaneously making gradients less prone to vanishing or exploding. Specifically, in batch normalization, the mean and variance are extracted across each channel and spatial locations. Each individual in the batch is normalized by subtracting the mean value and dividing by variance, and the data are recovered by shifting and scaling the normalized value during training. Accordingly, each final output 46 may be fed through the RNN 10.

Figure 3:
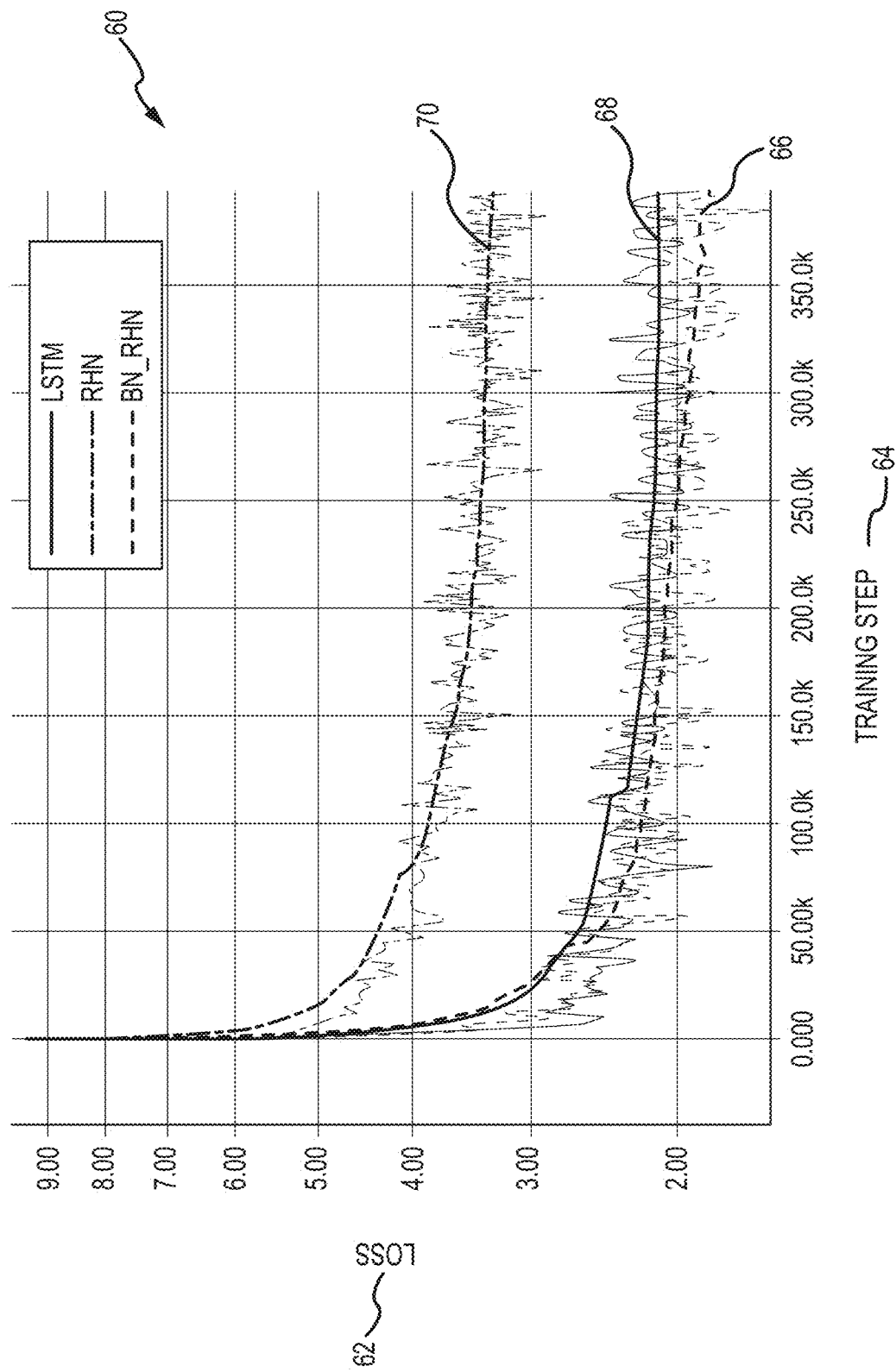
FIG. 3 is a graphical representation of loss change during training, in accordance with embodiments of the present disclosure.

FIG. 3 is a graphical representation 60 of an embodiment of an experimental operation of an RHN of the present invention, like RHN 30 from FIG. 2. The graphical representation 60 graphs loss 62 vs. training steps 64. Testing of the RHN was performed on an image captioning task. The evaluation was carried out on the popular MSCOCO captioning dataset. This dataset contains approximately 80,000 training images, approximately 40,000 validation images, and approximately 40,000 test images. With this data set, ground truth captions are only available for training and validation sets. In order to efficiently use the available data, the validation set is split into three parts: 85% of the images are merged into the training set, 10% are used for testing, and the remaining 5% are used as a validation set for hyperparameter tuning. All the experimental results are evaluated using the MSCOCO caption evaluation server.

When evaluating the data, experimental results are compared against metrics. Four different metrics were used for evaluation. First, BLEU is a metric for precision of word n-grams between predicted and ground truth sentences. Second, ROUGE-L takes into account sentence level structure similarity naturally and identifies the longest co-occurring sequence in n-grams automatically. Third, METEOR was designed to fix some of the problems found in the more popular BLEU metric, and also produces good correlation with human judgment at the sentence or segment level. It has several features not found in other metrics, such as stemming and synonymy matching, along with the standard exact word matching. Fourth, CIDEr computes the average cosine similarity between n-grams found in the generated caption and those found in reference sentences, weighting them using TF-IDF. In practice, METEOR is more semantically preferred than BLEU and ROUGE-L.

In the training phase, the <START> token is added at the beginning of the sentence and the <END> token at the end of the sentence so that the model can generate captions of varying lengths. In inference mode, the caption generation is started with <START> and the word combination with highest probability will be selected. The word embedding size and number of RHN neurons per layer are empirically set to 512. Based on empirical results, the evaluation adopted the recurrence depth D=3. However, in other embodiments, different recurrence depths may be used. Stochastic gradient descent is employed for optimization, where the initial learning rate and decay factor are set to 0.1 and 0.5, respectively, and the learning rate decays exponentially every 8 epochs. The initial time state vector is extracted from the Inception v3 model and all the other weight matrices are initialized with a random uniform distribution. The training process minimizes a softmax loss function. The proposed network is implemented using TensorFlow and trained on a server with dual GeForce GTX 1080 graphics cards. However, it should be appreciated that other networks and servers may be used.

The results of the MSCOCO imaging caption dataset are reported in Table 1. The evaluation metrics described above are evaluated with relationship to LSTM, RHN, and BN_RHN (i.e., batch normalized RHNs according to the present invention). The evaluation extracted an image feature vector as initialization of the hidden state using the same Inception v3 model, and lock the parameters in it (without fine-tuning) in all test models. Of the three test models (LSTM, RHN, and BN_RHN), LSTM denotes the im2txt model using regular LSTM cells, RHN denotes the image captioning generation performed by original RHNs, and BN_RHN in the present disclosure with batch normalization instead of the C=1−T constraint in RHN cell. Table 1 illustrates that the BN_RHN is the best performing model. METEOR and CIDEr are generally considered the most robust scores for captioning. The higher BLEU-4 and METEOR scores, due to fluency of language in the image captions, can be attributed to the RHN depth. More depth increases the complexity that helps learn the grammatical rules and language semantics. The LSTM employs a mechanism with input, output, and forget gates to generate complex captions. The present invention demonstrates better performance than LSTM, which may indicate that simplifying the gate mechanism and increasing depth do not affect performance for image captioning. The test model with RHN cells benefits from having less parameters during training, and good gradient control, in a simple way. The present invention BN_RHN achieves better results than original RHN, because the gate value model biases are more flexible, and batch normalization guarantees the steady gradient flow in back propagation.

TABLE 1

| Model | LSTM | RHN | BN_RHN |
| --- | --- | --- | --- |
| BLEU-1 | 0.706 | 0.688 | 0.710 |
| BLEU-2 | 0.533 | 0.512 | 0.541 |
| BLEU-3 | 0.397 | 0.377 | 0.408 |
| BLEU-4 | 0.298 | 0.281 | 0.311 |
| ROUGE-L | 0.524 | 0.511 | 0.533 |
| METEOR | 0.248 | 0.241 | 0.254 |
| CIDEr | 0.917 | 0.864 | 0.955 |

Returning again to FIG. 3, a comparison was also made based on the speed of convergence. FIG. 3 illustrates the loss change during training, or deep learning, for each of the three test models. The BN_RHN model 66, as described by the various embodiments herein, achieves the steady loss fastest among all three models. Adding batch normalization allows a more aggressive learning rate and achieves faster convergence. Furthermore, during back propagation in the original LSTM 68 and RHN 70 models, a gradient norm clipping strategy is adopted to deal with exploding gradients and a soft constraint for the vanishing gradients problem to generate reasonable captions. For BN_RHN, this restriction can be relaxed. This confirms that the present invention is effective on gradient control. It should be appreciated that in FIG. 3, all dark curves are smoothed by a factor of 0.8, while light curves are not smoothed.

FIG. 4 is a graphical representation of captions 80 obtained from image files 82 using the LSTM, RHN, and BH_RHN models. In FIG. 4, "G.T." in captions 80 represents the ground truth. The image files 82 illustrated in FIG. 4 were picked randomly. As illustrated in FIG. 4, the captions generated utilizing the BH_RHN are improved over the RHN model. For example, the BN_RHN model describes the object in the image more accurately than the other models and can generate better descriptions of the image even for very complex images than the other models. Additionally, the captions generated by the BN_RHN model have better grammar and language semantics due to the increased depth of recurrent network. Accordingly, embodiments of the present invention illustrate a method that provides improved results while also enabling more aggressive learning rates and faster convergence.

The foregoing disclosure and description of the disclosed embodiments is illustrative and explanatory of the embodiments of the invention. Various changes in the details of the illustrated embodiments can be made within the scope of the appended claims without departing from the true spirit of the disclosure.

The invention claimed is:

1. A computer-implemented method for image object recognition and captioning, comprising:
   loading a pre-trained model into a multi-layer Recurrent Highway Network;
   receiving a digital image input on which to perform object recognition, the digital image input containing one or more objects;
   batch normalizing the digital image input by applying one or more non-linear transforms to the digital image input to generate transform outputs from the multi-layer Recurrent Highway Network; and
   combining the transform outputs to generate a final output from the multi-layer Recurrent Highway Network, wherein the final output comprises a caption describing the one or more objects recognized in the digital image input.

2. The method of claim 1 wherein the pre-trained model contains parameters for the computing network nodes.

3. The method of claim 1 wherein the multi-layer neural network is a batch-normalized Recurrent Highway Network.

4. The method of claim 3 wherein the constraints within the Recurrent Highway Network are relaxed to reduce or avoid gradient vanishing or exploding by normalizing the current transition units in highway layers.

5. The method of claim 4, wherein a gradient norm clipping strategy is adopted to improve language semantics of the caption.

6. A computer-implemented method for image object recognition and captioning, comprising:
   receiving a digital image input on which to perform object recognition, the digital image input containing one or more objects;
   batch normalizing the digital image input by applying one or more non-linear transforms to the digital image input to generate transform outputs from a multi-layer Recurrent Highway Network, wherein batch normalizing occurs at one or more highway layers of the multi-layer Recurrent Highway Network, wherein the one or more highway layers comprise a transform gate and a carry gate, and wherein the transform gate is coupled to the carry gate; and
   combining the transform outputs to generate a final output, wherein the final output comprises a caption describing the one or more objects in the digital image input.

7. The computer-implemented method of claim 6, wherein the digital image input is an output of a prior processing loop in the recurrent highway network.

8. The computer-implemented method of claim 6, wherein batch normalizing the digital image input comprises extracting a mean and a variance across each channel and spatial location.

9. The computer-implemented method of claim 8, wherein batch normalizing the digital image input comprises subtracting the mean of the digital image input and dividing by the variance of the digital image input.

* * * * *